(12) United States Patent
Bolin et al.

(10) Patent No.: US 9,830,001 B2
(45) Date of Patent: Nov. 28, 2017

(54) METHOD, DEVICE AND SYSTEM FOR COLLECTING WRITING PATTERN USING BAN

(71) Applicant: Sony Corporation, Tokyo (JP)

(72) Inventors: Thomas Bolin, Lund (SE); Henrik Bengtsson, Lund (SE); Erik Bengtsson, Eslov (SE); Ola Thorn, Limhamn (SE); Aleksandar Rodzevski, Malmo (SE)

(73) Assignee: Sony Mobile Communications Inc., Tokyo (JP)

( * ) Notice: Subject to any disclaimer, the term of this patent is extended or adjusted under 35 U.S.C. 154(b) by 254 days.

(21) Appl. No.: 14/612,503

(22) Filed: Feb. 3, 2015

(65) Prior Publication Data

US 2016/0224137 A1 Aug. 4, 2016

(51) Int. Cl.
*G06F 3/038* (2013.01)
*G06F 3/0354* (2013.01)
(Continued)

(52) U.S. Cl.
CPC .......... *G06F 3/03545* (2013.01); *G06F 1/163* (2013.01); *G06F 3/011* (2013.01); *G06F 3/014* (2013.01); *G06F 3/038* (2013.01); *G06F 3/0346* (2013.01); *H04B 13/005* (2013.01); *G06F 2203/0382* (2013.01); *G06F 2203/0384* (2013.01)

(58) Field of Classification Search
CPC ...... G06F 3/03545; G06F 1/163; G06F 3/011; G06F 3/014; G06F 3/0346; G06F 3/038; G06F 2203/0382; G06F 2203/0384; G06F 3/0354; G06F 3/0386; H04B 13/005

USPC .......................................................... 345/179
See application file for complete search history.

(56) References Cited

U.S. PATENT DOCUMENTS 6,580,356 B1 6/2003 Alt et al.
7,170,499 B1 * 1/2007 Lapstun ............... B41J 2/17503
178/18.01
(Continued)

FOREIGN PATENT DOCUMENTS

DE 10 2012 101 336 A1 2/2013
EP 1 363 182 A1 11/2003
(Continued)

OTHER PUBLICATIONS

Hendricks, "For Those Who Think Young", Mad Men, Season 2, Episode 1, Jul. 2008.*
(Continued)

*Primary Examiner* — Julie Anne Watko
(74) *Attorney, Agent, or Firm* — Renner, Otto, Boisselle, & Sklar, LLP

(57) ABSTRACT

A method, device and system for collecting writing pattern using Body Area Network, BAN, wherein the BAN comprises at least one BAN enabled writing device, e.g. a pen and at least one wearable BAN enabled communication device, e.g. a wristlet, worn by a user, wherein a BAN link is established through the body of the user between the writing device and the communication device, when the user touches the writing device, the writing pattern is created and collected by using the writing device and streamed from the writing device to the wearable device by using the established BAN link.

20 Claims, 8 Drawing Sheets

(51) Int. Cl.
*G06F 3/0346* (2013.01)
*H04B 13/00* (2006.01)
*G06F 3/01* (2006.01)
*G06F 1/16* (2006.01)

(56) References Cited

U.S. PATENT DOCUMENTS

| | | | |
|---|---|---|---|
| 7,202,773 B1 | 4/2007 | Oba et al. | |
| 8,547,363 B2* | 10/2013 | Xu | G06F 3/0346 178/18.01 |
| 8,971,568 B1* | 3/2015 | Smits | G06F 3/03545 348/169 |
| 2002/0002539 A1* | 1/2002 | Fahraeus | G06F 3/03545 705/51 |
| 2003/0091234 A1* | 5/2003 | Lapstun | B41J 2/17503 382/187 |
| 2004/0108990 A1* | 6/2004 | Lieberman | H03K 17/9638 345/156 |
| 2005/0008148 A1 | 1/2005 | Jacobson | |
| 2005/0243061 A1 | 11/2005 | Liberty et al. | |
| 2007/0145119 A1 | 6/2007 | Rhelimi | |
| 2007/0152986 A1* | 7/2007 | Ogawa | G06F 3/0421 345/179 |
| 2007/0282783 A1 | 12/2007 | Singh | |
| 2009/0094681 A1 | 4/2009 | Sadler et al. | |
| 2009/0233548 A1 | 9/2009 | Andersson et al. | 455/41.2 |
| 2009/0267896 A1* | 10/2009 | Hiramatsu | G06K 9/222 345/157 |
| 2010/0277435 A1 | 11/2010 | Han et al. | |
| 2011/0205156 A1 | 8/2011 | Gomez et al. | |
| 2011/0299512 A1* | 12/2011 | Fukuda | G06F 1/163 370/338 |
| 2012/0026129 A1 | 2/2012 | Kawakami | |
| 2012/0242603 A1* | 9/2012 | Engelhardt | G06F 3/03545 345/173 |
| 2012/0249409 A1 | 10/2012 | Toney et al. | |
| 2012/0324368 A1 | 12/2012 | Putz et al. | |
| 2013/0017789 A1 | 1/2013 | Chi et al. | |
| 2013/0142363 A1 | 6/2013 | Amento et al. | 381/151 |
| 2013/0174049 A1 | 7/2013 | Townsend et al. | |
| 2013/0194092 A1* | 8/2013 | Moriarty | A61B 5/0022 340/539.12 |
| 2014/0085050 A1 | 3/2014 | Luna | |
| 2014/0270233 A1 | 9/2014 | Chandra et al. | 381/74 |
| 2016/0048718 A1* | 2/2016 | Apostolos | G06K 9/00087 382/124 |

FOREIGN PATENT DOCUMENTS

| | | |
|---|---|---|
| EP | 2018038 | 1/2009 |
| EP | 2378748 | 10/2011 |
| EP | 2600319 | 6/2013 |
| JP | 2008 073462 | 4/2008 |
| JP | 2009 049951 | 3/2009 |
| WO | 2011/021531 | 2/2011 |

OTHER PUBLICATIONS

Shastry et al, "Dynamic Signature Verification using Embedded Sensors", International Conference on Body Sensor Networks, IEEE Computer Society, 2011.*

Wade and Asada. Cable-Free Wearable Systems Using Conductive Fabrics Transmitting Signals and Power. Smart Structures and Materials 2005: Smart Sensor Technology and Measurement Systems, edited by Eric Udd, Daniele Inaudi, Proceedings of SPIE vol. 5758 (SPIE, Bellingham, WA, 2005) p. 285-295.*

Bionym, "The Nymi White Paper", Nov. 19, 2013.

International Search Report for corresponding PCT International Application No. PCT/IB2015/054446, dated Oct. 16, 2015.

* cited by examiner

METHOD, DEVICE AND SYSTEM FOR COLLECTING WRITING PATTERN USING BAN

TECHNICAL FIELD

The present disclosure relates in general to the field of wireless communication devices and wearable communication devices, and particularly to a system, devices and methods equipped with, and utilizing Body Coupled communication, BCC, technology for collecting writing pattern within a Body Area Network, BAN.

BACKGROUND

There is an emerging consumer market for certain devices that are used as companion products to smartphone devices. Their popularity can be traced, in part, to the variety of features they provide to a user. For example, one such device is a wearable device worn by the user, such as a ring, a necklace, glasses, or a wristlet, e.g. a watch or wristband, which is worn around a user's wrist. Typically, such wearable devices may provide different features, such as a logging function that monitors the user's motion and resting activities, and then sends a report on the detected motion and activities to the user's smartphone for storage in memory. Another feature allows the wearable devices to be used as a personal token to automatically gain access to a smartphone that has been locked. Particularly, a wearable device worn by a user may communicate with the user's smartphone, thereby permitting the user to bypass the manual entry of a predetermined unlock sequence associated with the smartphone.

Such features are already present on commercial products/devices. However, common issues associated with these devices are that they either need a physical interface, e.g. a 3.5 mm audio plug, an Universal Serial Bus (USB), etc.) or some sort of wireless "local connectivity", e.g. BLUETOOTH, Wi-Fi, Near Field Communication (NFC), etc., in order to transmit data between the devices. Such methods for communication, however, can be cumbersome. Additionally, these types of communication may be a limiting factor that could contain new features waiting to be implemented on such devices.

There are not many options today for digitally storing and tracking a person's text, signatures or scribbles. There are some digital pens on the market but these would either require a special surface/paper or having an optical medium used for recording already written text in order to store it. Instead, many people are using their smart phones to take a picture of signatures and/or significant notes and writings but this can be intrusive and in some cases offensive towards other people. There is a need for a simple, easier, more intuitive and secure way of recording writings by means of easy and convenient methods.

SUMMARY

With the above description in mind, an object of the present disclosure is to provide a method and system with devices which record writing, which seeks to mitigate, alleviate, or eliminate one or more of the above and below identified deficiencies in the art and disadvantages singly or in any combination.

This can be solved by using a Body Area Network, BAN, enabled writing communication device together with a wearable and/or wireless communication device such as a wristband, watch, phone or tablet. Signatures, scribbles and other writings are collected through the BAN enabled writing device to a host device, the wearable and/or wireless communication device. Meta data such as a time-stamp, position and ID may be stored with the writing pattern.

These and further objects are achieved by a system, devices and methods equipped with, and utilizing Body coupled communication, BCC, technology. The disclosure provides for a system, methods and devices for collecting character data by using a Body Area Network, BAN.

The present disclosure is defined by the appended claims. Various advantageous embodiments of the disclosure are set forth by the appended claims as well as by the following description and the accompanying drawings.

An aspect of the present disclosure relates to a method for collecting writing pattern using Body Area Network, BAN, wherein the BAN comprises at least one BAN enabled writing device and at least one wearable BAN enabled communication device, worn by a user. The method comprises the steps of establishing a BAN link through the body of the user between the writing device and the communication device, when the user touches the writing device, creating and collecting writing pattern by using the writing device and streaming the collected writing pattern by using the established BAN link. In one aspect, the created writing pattern is collected by means of an optical unit. In one example, the optical unit is any of a camera, an optical sensor, a photodiode or a combination thereof. In one aspect, the created writing pattern is collected by means of at least one sensor component configured for tracking the writing pattern when created by the user. In one example, the sensor component is any of an accelerator, gyro or a combination thereof.

In one embodiment, the method comprises receiving and storing the streamed writing pattern. In one aspect the method comprises the step of adding meta data, wherein the meta data comprising any of personal information of the user or position information of the user, to the collected writing pattern before storing the writing pattern.

An aspect of the present disclosure relates to a Body Area Network, BAN, enabled writing device for collecting writing pattern by using a BAN, wherein the writing pattern is created by a user of the writing device. The writing device comprises a processing circuitry configured to establish a BAN link through the body of the user between the writing device and a wearable BAN enabled communication device, worn by said user, when the user touches the writing device. The writing device comprises a collecting unit configured to collect the created writing pattern and a streaming unit configured to stream said collected writing pattern by using said established BAN link. In one aspect, the collecting unit comprises at least one sensor component configured to tracking the writing pattern when created by the user when using the writing device. In one example, the sensor component is one of an accelerator, gyro or a combination thereof. In one aspect, the collecting unit comprises an optical unit configured to recording the written pattern when created by the user when using the writing device. In one example, the optical unit is any of a camera, optical sensor or a photodiode.

In one embodiment, the writing device is included in a body designed as a stylus or pen.

An aspect of the present disclosure relates to a wearable Body Area Network, BAN enabled communication device, worn by a user, for collecting writing pattern by using BAN, wherein the writing pattern is created by the user of a BAN enabled writing communication device. The wearable communication device comprises a processing circuitry configured to establish a BAN link through the body of the user between the wearable BAN enabled communication device and the writing device, when the user touches the writing device and receive and store a streamed writing pattern from the writing device. In one aspect, processing circuitry is configured to add meta data, wherein the meta data comprises any of personal information of the user or position information of the user, to the received writing pattern before storing the writing pattern.

An aspect of the present relates to a system for collecting writing pattern using a Body Area Network, BAN, wherein the system comprises a BAN enabled writing device and at least one wearable BAN enabled communication device, worn by a user, the writing pattern is created by a user of the writing device.

The features of the above-mentioned embodiments can be combined in any combinations.

BRIEF DESCRIPTION OF THE DRAWINGS

Further objects, features and advantages of the present invention will appear from the following detailed description of the invention, wherein embodiments of the invention will be described in more detail with reference to the accompanying drawings, in which.

DETAILED DESCRIPTION

Figure 1:
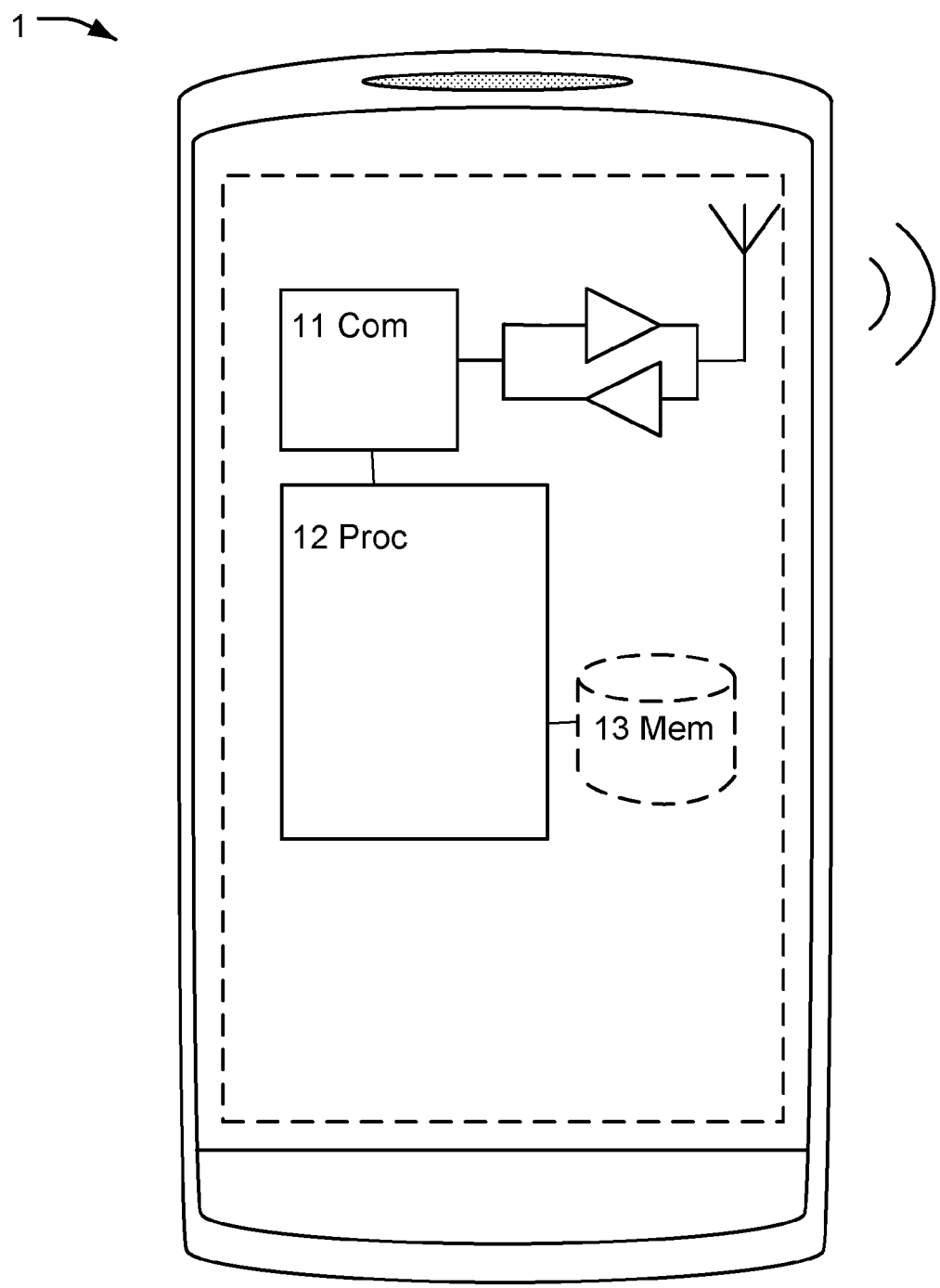
FIG. 1 shows an example of a wireless communication device.

Aspects of the present invention will be described more fully hereinafter with reference to the accompanying drawings. The devices and methods disclosed herein can, however, be realized in many different forms and should not be construed as limited to aspects set forth herein. Like reference signs refer to like elements throughout the text.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Embodiments of the present invention will be exemplified using a wireless device such as a mobile phone. However, it should be appreciated that the invention is as such equally applicable to any devices which have Body coupled communication, BCC, capabilities. Example of such devices may for instance be any type of mobile phone, smartphone, laptop (such as standard, ultra portables, netbooks and micro laptops), handheld computers, portable digital assistants (PDAs), tablet computers, touch pads, gaming devices, accessories to mobile phones, e.g. wearable communication devices in the form of headphones/-sets, visors/googles, bracelets, wristbands, necklaces, watches, headbands, rings, etc. It should be noted that a wireless communication device is any communication device equipped with communication means and can be e.g. a coffee machine, lamp post or a pen.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Body Coupled Communication, BCC, or also called Body-based Communication, BBC or Near Body Communication, NBC, has been proposed as a promising alternative to radio frequency, RF, communication as a basis for Body/Personal Area Network, BAN/PAN, communication. BCC allows for an exchange of information between a plurality of devices which are in contact with or in close proximity of a living body. This can be achieved by a transmitting BCC-/BAN-antenna that provide a capacitive or galvanic coupling of low-energy electric fields onto the body surface, i.e. leakage current with a small magnitude is set to spread out over the human body. The small currents are then detected by a receiver BCC antenna, located on the body. Thus, signals are conveyed over the body instead of through the air. As such, the communication is configured to the volume close to the body in contrast to RF communications, where a much larger volume is covered. Therefore, communication is possible between devices situated on, connected to, or placed close to the body. The power consumption of BCC-antennas is very low.

A Body Area Network, BAN, also referred to as a Wireless body area network, WBAN or body sensor network, BSN, is a wireless network of Body Coupled Communication, BCC, devices. BCC devices is also referred to as BAN enabled devices and they may be embedded inside the body, implants, may be surface-mounted on the body in a fixed position or may be accompanied devices which humans can touch or carry in different positions, in clothes pockets, by hand or in various bags.

Body Area Network, BAN, standards such as IEEE's 802.15.6 or Sony's CCCC is enabling the possibilities for commercialized BAN devices. The first BAN devices have its background in the medical area, as BAN is a communication standard optimized for low power devices and operation on, in or around the human body. The BCC/BAN techniques has previously also been employed in the fields of exercise or motion. Within these fields, sensors attached to the users skin or worn in the close proximity of the body is employed for monitoring different body functions in order to keep track of medical status or fitness parameters of the user.

FIG. 1 shows a wireless communication device according to some aspect of the disclosure. The figure illustrates a BAN enabled wireless communication device 1, comprising communication circuitry 11 and processing circuitry 12. The wireless communication device further comprises a memory 13 for storing data. The memory may be any type of memory suitable for a wireless communication device.

Figure 2:
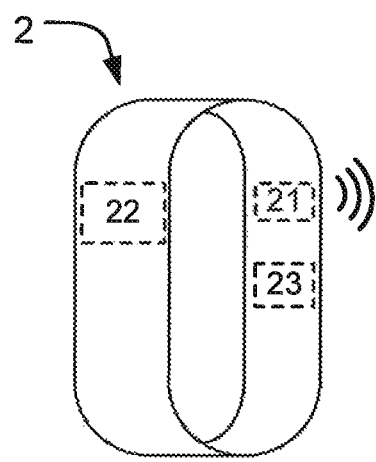
FIG. 2-6 shows examples of wearable communication devices.
Figure 3:
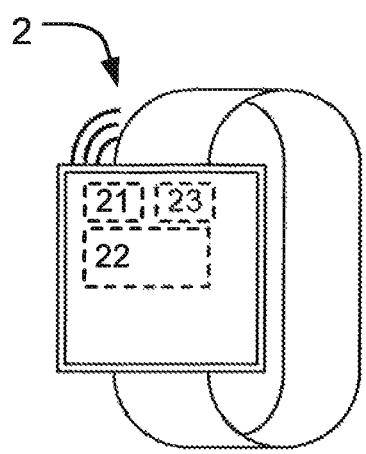
Figure 4:
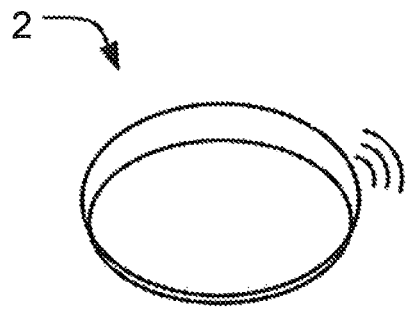
Figure 5:
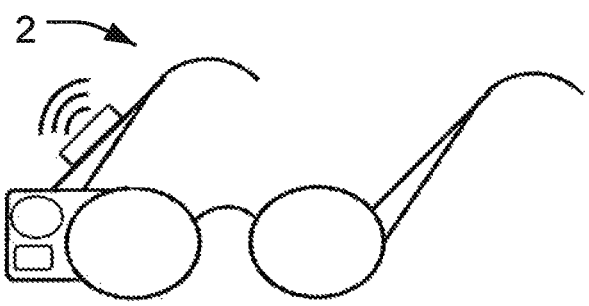
Figure 6:
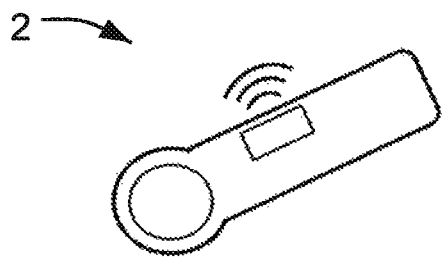

FIGS. 2 to 6 shows examples of BAN enabled wearable communication devices 2. The wearable communication devices comprise communication circuitry 21 and processing circuitry 22. The wearable communication devices further comprises a memory 23 for storing data. The memory may be any type of memory suitable for a wearable communication device. FIG. 2 is a wristlet, FIG. 3 is a watch, FIG. 4 is a ring, FIG. 5 is glasses and FIG. 6 is a headpiece.

Figure 7:
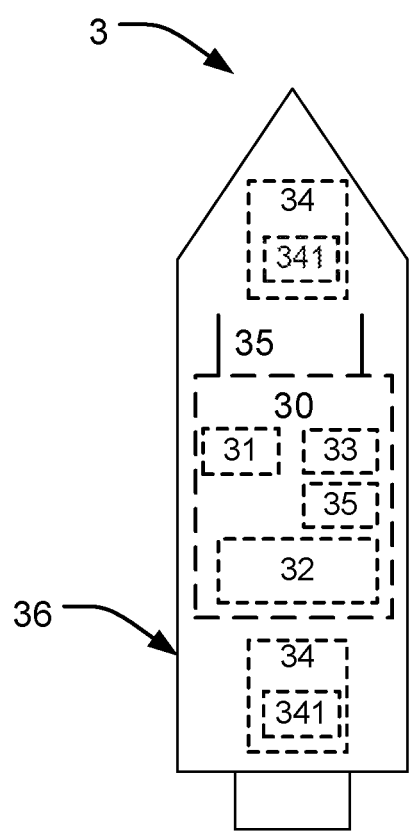
FIG. 7 shows example of a writing communication device.

A BAN enabled writing communication device is illustrated in FIG. 7. The writing communication device comprises BAN enabled Printed Circuite Board, PCB, 30 comprising a communication circuitry 31 and processing circuitry 32. The writing communication device further comprises a memory 33 for storing data. The memory may be any type of memory suitable for a wearable communication device. The writing communication device further comprises BAN enabled electrodes 35 for sensing presence of a body part of a user.

Figure 8:
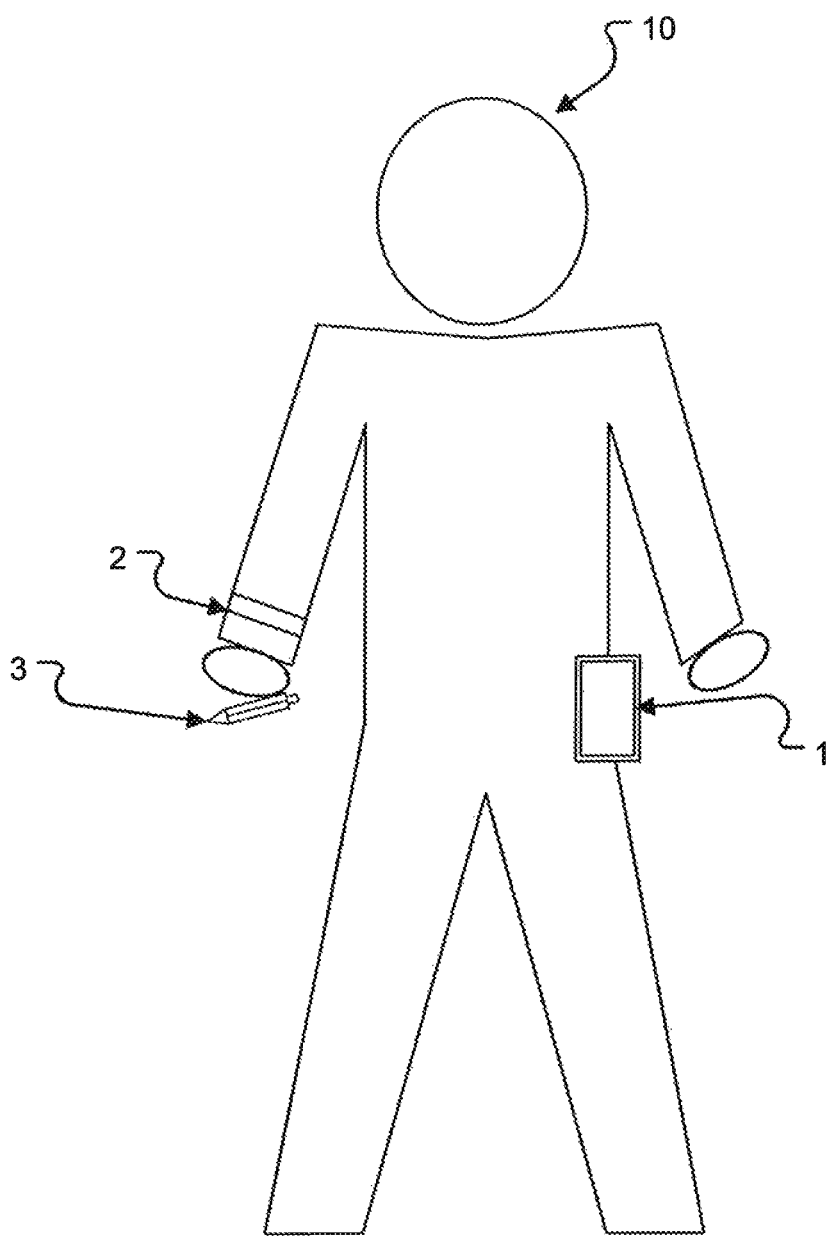
FIG. 8 illustrates a system according to the present invention with a user wearing a wireless communication device, a wearable communication device and a writing communication device.

A system of a wireless communication device 1, a wearable communication device 2 and a writing communication device 3 is illustrated in FIG. 8. In the example in the figure the wireless communication device 1 is a smartphone, the wearable communication devices 2 is a wristlet and the writing communication device 3 a pen, all located on, or in the vicinity of, the body of the user 10.

Figure 9:
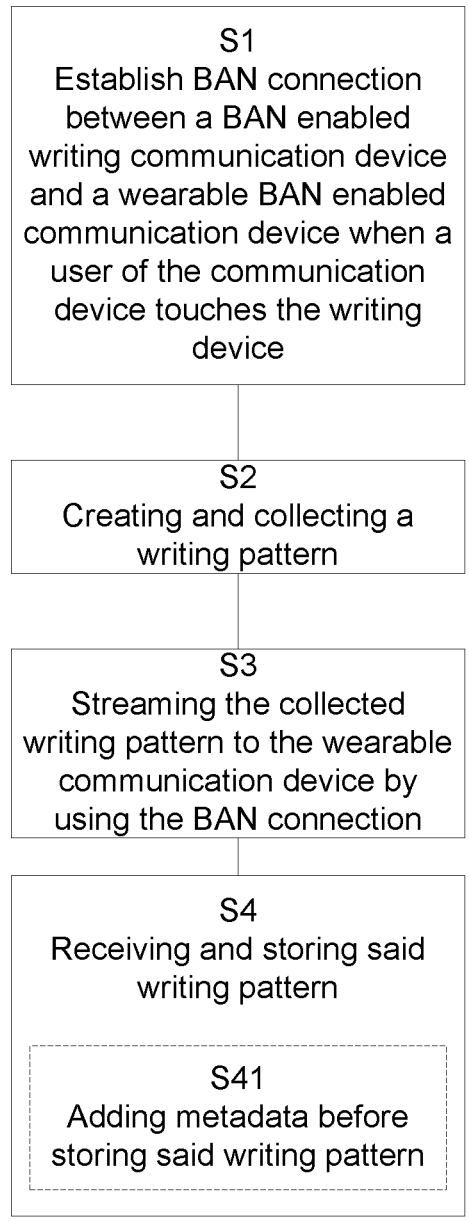
FIG. 9 is a flowchart illustrating the proposed method, performed in a system for collecting writing movement pattern.
Figure 10:
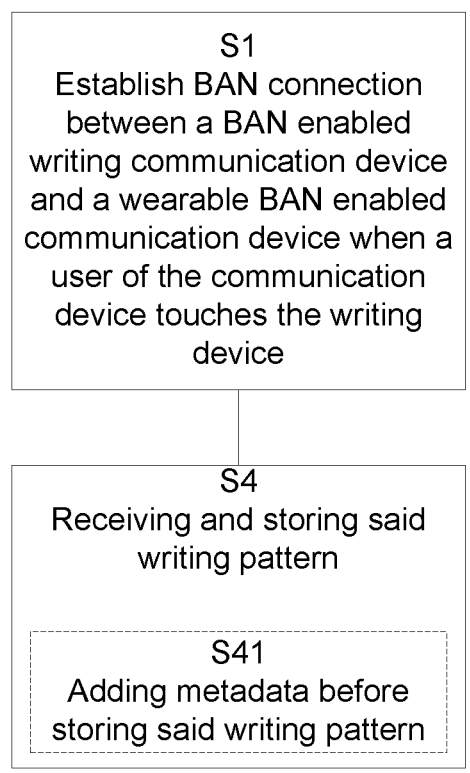
FIG. 10 is a flowchart illustrating the proposed method, performed in a wearable communication device for collecting writing movement pattern.
Figure 11:
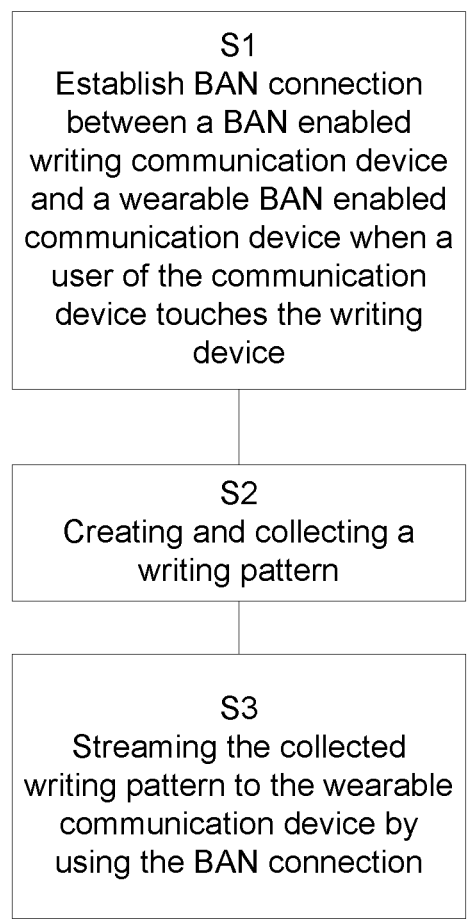
FIG. 11 is a flowchart illustrating the proposed method, performed in a writing communication device for collecting writing movement pattern.

FIG. 9 is a flow diagram depicting example operations which may be taken by a writing pattern collecting system comprising at least one wearable communication device 2 of FIGS. 2-6 and a writing communication device 3 of FIG. 7 for collecting writing pattern. The wearable communication device 2 and the writing communication device 3 are BAN enabled and communicates using BCC. FIG. 10 specifies the steps taken by the wearable communication device 2 and FIG. 11 specifies the steps taken by the writing communication device 3. All steps performed will be described hereafter in a logical order of the steps and not in the order of which device performs which steps.

According to some aspect the method for collecting writing pattern using Body Area Network, BAN, and the BAN enabled wearable communication device 2, worn by a user, comprises establishing S1 a BAN link through the body of the user between a BAN enabled writing communication device 3 and the wearable communication device 2 when the user touches the writing device 3. According to some aspects, the establishing of a BAN link is performed by a processing circuitry 32 of the writing device 3 and/or a processing circuitry 22 of the wearable communication device 2 through the body of the user between the writing device 3 and a wearable BAN enabled communication device 2, worn by the user 10, when the user touches the writing device 3.

In one embodiment a wireless communication device 1, e.g. a smartphone has been BCC paired with a wearable communication device, e.g. a wristband, where the smartphone has sent over its user ID. The ID will then be stored in the wristband as long as the user wears it or until erased through commands from the smartphone. In one aspect the wristband has the capabilities of tracking location by using GPS, storing data in a Flash memory, providing local connectivity by using BT/BLE/Wi-Fi and holds a BAN enabled writing communication device application. The application is able to interact with a BAN enabled writing communication device when the writing communication device is present and a user ID is stored.

The method comprises creating and collecting S2 writing pattern by using the writing device 3. In one aspect the user is writing a text by using the writing device 3, e.g. a BAN enabled pen and the writing pattern is associated with at least one written character of the text. According to some aspects, the collecting of writing pattern is performed by a collecting unit 34 configured to collect a writing pattern created by the user. According to some aspect, the collecting unit 34 comprises at least one sensor component 341 configured to tracking the writing pattern when created by the user with the writing device. According to some aspect the sensor component is one of an accelerator, gyro or a combination thereof. According to some aspect, the collecting unit comprises a sensor component in the form of an optical unit configured to record the writing pattern when created by the user when using said writing device. According to some aspect, the optical unit is any of a camera, an optical sensor, a photodiode or a combination thereof. In one aspect the optical unit is located at the tip of the writing device. According to some aspects, the collecting unit comprises an Electric Field, EF, sensor configured to recognize the moving pattern of the writing device to record the writing pattern.

The method comprises streaming S3 the created writing pattern by using the established BAN link to any of said wearable communication device 2 or wireless communication device 1. According to some aspect, the streaming of writing pattern is performed by a streaming unit 35 configured to stream the collected writing pattern to e.g. a wearable communication device 2 or a wireless communication device 1, by using the established BAN link.

The method comprises receiving and storing S4 the streamed writing pattern in any of said wearable communication device 2 or wireless communication device 1. According to some aspect, the processing circuitry 22 of the wearable communication device is configured to receive and store the streamed writing pattern.

The method comprises adding S41 meta data, wherein the meta data comprises any of personal information of the user or position information of the user, such as User ID, biometric data, fingerprint pattern etc., to the collected writing pattern before storing the pattern. According to some aspect, said processing circuitry 22 of the wearable communication device is configured to add meta data to the received writing pattern before storing the pattern.

In one embodiment, the writing device is included in a body 36 designed as a regular stylus or pen.

The concept requires that the user has a BAN enable communication device, a host device, on which the user has identified him/her-self. This may be a Smart phone or wristlet or similar. The stylus connects to the host device, over BAN, and starts to stream the users writing pattern to the host device. The coding can be implemented as micro vibrations/motions in x/y and/or z direction in the stylus resulting in modulation of the writings. The host device can choose to either store the streamed data on a local flash or act as a gateway and bypass the data to another end point, such as a BAN connected phone, tablet, cloud storage etc. Independent of direct storage the data is intended to be offloaded to a private entity at some point. A private entity application, residing on a phone, tablet, cloud storage or other, handles the refining, archiving and presenting of writings when needed.

One example of a scenario, as shown in FIG. 8, a user is wearing a wristband 2, which is already BCC paired with a phone 1, picks up a BAN enabled pen 3 and writes its signature. Due to the nature of BAN it is possible for a device to support multi-node communication where in this example the wristband connects both to the phone and to the pen. The connection from the wristband to the phone will be interactive where the user needs to make a choice of connecting, while on the pen it will be dynamic and automatically connect upon its presence.

In one embodiment this can be done with the phone 1 only, considering that the user holds it in its hand or pocket. In one embodiment this can be done with a refined wristband/smart watch 2 with its own network access, or proprietary solution.

In one embodiment the user only carries a personalized BAN enabled writing communication device 3, e.g. a pen, thus without a wearable communication device 2 or a wireless communication device 1 where the authorization might, or might not, be stored on the pen through an authentication procedure, e.g. sign in by air gestures, fingerprint, cloud sync etc. As an example, when other BAN enabled devices 1, 2 are present the writing communication device 3 sends out a notification about its presence and depending of user ID/credentials the user might be notified of written pattern being available.

Embodiments and aspects are disclosed in the following items:

Item 1. A method for collecting writing pattern using Body Area Network, BAN, wherein said BAN comprises at least one BAN enabled writing device and at least one wearable BAN enabled communication device, worn by a user, wherein said method comprising the steps of:
establishing a BAN link through the body of said user between said writing device and said communication device, when said user touches said writing device;
creating and collecting writing pattern by using said writing device; and
streaming said collected writing pattern by using said established BAN link.

Item 2. The method according to Item 1, wherein said method comprises receiving and storing said streamed writing pattern.

Item 3. The method according to item 1 or 2, wherein said method comprising the step of:
adding S5 meta data, wherein said meta data comprising any of personal information of said user or position information of said user, to said collected writing pattern before storing said writing pattern.

Item 4. The method according to any of the preceding Items, wherein said created writing pattern is collected by means of an optical unit.

Item 5. The method according to Items 4, wherein said optical unit is any of a camera, an optical sensor, a photodiode or a combination thereof.

Item 6. The method according to any of the preceding Items, wherein said created writing pattern is collected by means of at least one sensor component configured for tracking the writing pattern when created by said user.

Item 7. The method according to Item 6, wherein said sensor component is any of an accelerator, gyro or a combination thereof.

Item 8. A Body Area Network, BAN, enabled writing device for collecting writing pattern by using a BAN, wherein said writing pattern is created by a user of said writing device and said writing device comprises:

a processing circuitry configured to:
  i. establish a BAN link through the body of said user between said writing device and a wearable BAN enabled communication device, worn by said user, when said user touches said writing device;
a collecting unit configured to collect said created writing pattern; and
a streaming unit configured to stream said collected writing pattern by using said established BAN link.

Item 9. The writing device according to Item 8, wherein the collecting unit comprises at least one sensor component configured to tracking said writing pattern when created by the user when using said writing device.

Item 10. The writing device according to Item 9, wherein the sensor component is one of an accelerator, gyro or a combination thereof.

Item 11. The writing device according to one or several of Items 8 to 10, wherein the collecting unit comprises an optical unit configured to recording said written pattern when created by the user when using said writing device.

Item 12. The writing device according to Item 11, wherein said optical unit is any of a camera, optical sensor or a photodiode.

Item 13. The writing device according to any of Items 8 to 12, wherein the writing device is included in a body designed as a stylus or pen.

Item 14. A wearable Body Area Network, BAN enabled communication device, worn by a user, for collecting writing pattern by using BAN, wherein said writing pattern is created by said user of a BAN enabled writing communication device and said wearable communication device comprises:
a processing circuitry configured to:
  i. establish a BAN link through the body of said user between said wearable BAN enabled communication device and said writing device, when said user touches said writing device;
  ii. receive and store a streamed writing pattern from said writing device.

Item 15. The communication device according to Item 14, wherein said processing circuitry is configured to:
add meta data, wherein said meta data comprises any of personal information of said user or position information of said user, to said received writing pattern before storing said writing pattern.

Item 16. A system for collecting writing pattern using a Body Area Network, BAN, wherein said system comprises a BAN enabled writing device and at least one wearable BAN enabled communication device, worn by a user, said writing pattern is created by a user of said writing device and wherein said writing device comprises:
a processing circuitry configured to:
  i. establish a BAN link through the body of said user between said writing device and said at least one wearable BAN enabled communication device, worn by said user, when said user touches said writing device;
a collecting unit configured to collect said writing pattern, and
a streaming unit configured to stream said collected writing pattern by using said established BAN link,
wherein said wearable BAN enabled communication device comprises:

a processing circuitry configured to:
  i. establish said BAN link between said wearable communication device and said writing device;
  ii. receive and store said streamed writing pattern.

Item 17. The system according to Item 16, wherein the collecting unit of the writing device comprises at least one sensor component configured to tracking said writing pattern when created by the user with said writing device.

Item 18. The system according to Item 17, wherein the sensor component of the writing device is one of an accelerator, gyro or a combination thereof.

Item 19. The system according to one or several of Items 16 to 18, wherein the collecting unit of the writing device comprises at least one optical unit configured to recording said written pattern when created by the user when using said writing device.

Item 20. The system according to one or several of Items 16 to 19 wherein said processing circuitry of said wearable communication device is configured to:
  add metadata, wherein said meta data comprising any of personal information of said user or position information of said user, to said received writing pattern before storing said writing pattern.

The foregoing has described the principles, preferred embodiments and modes of operation of the present disclosure. However, the disclosure should be regarded as illustrative rather than restrictive, and not as being limited to the particular embodiments discussed above. The different features of the various embodiments of the disclosure can be combined in other combinations than those explicitly described. It should therefore be appreciated that variations may be made in those embodiments by those skilled in the art without departing from the scope of the present disclosure as defined by the following claims.

What is claimed is:

1. A method for collecting writing pattern using Body Area Network, BAN, wherein said BAN comprises at least one BAN enabled writing device, a wireless communication device and at least one wearable BAN enabled communication device, worn by a user, wherein said method comprising the steps of:
  receiving at least one of a user ID or user credentials in the wearable BAN enabled communication device from the wireless communication device;
  storing the at least one of the user ID or user credentials in the wearable BAN enabled communication device;
  establishing a BAN link through the body of said user between said BAN enabled writing device and said wearable BAN enabled communication device, when said user touches said writing device;
  creating and collecting writing pattern by using said BAN enabled writing device; and
  streaming said collected writing pattern by using said established BAN link to said wearable BAN enabled communication device, provided that at least one of a user ID or user credentials is stored in the wearable BAN enabled communication device.

2. The method according to claim 1, wherein said method comprises receiving and storing said streamed writing pattern.

3. The method according to claim 2, wherein said method comprising the step of:
  adding meta data, wherein said meta data comprising any of personal information of said user or position information of said user, to said collected writing pattern before storing said writing pattern.

4. The method according to claim 1, wherein said created writing pattern is collected by means of an optical unit.

5. The method according to claim 4, wherein said optical unit is any of a camera, an optical sensor, a photodiode or a combination thereof.

6. The method according to claim 1, wherein said created writing pattern is collected by means of at least one sensor component configured for tracking the writing pattern when created by said user.

7. The method according to claim 6, wherein said sensor component is any of an accelerometer, gyro or a combination thereof.

8. A Body Area Network, BAN, enabled writing device for collecting writing pattern by using a BAN, wherein said writing pattern is created by a user of said writing device and said writing device comprises:
  a processing circuitry configured to:
    i. establish a BAN link through the body of said user between said BAN enabled writing device and a wearable BAN enabled communication device, worn by said user, when said user touches said writing device;
  a collecting unit configured to collect said created writing pattern; and
  a streaming unit configured to stream said collected writing pattern by using said established BAN link, responsive to the user touching the BAN enabled writing device and at least one of a user ID or user credentials being stored in the wearable BAN enabled communication device.

9. The writing device according to claim 8, wherein the collecting unit comprises at least one sensor component configured to tracking said writing pattern when created by the user when using said writing device.

10. The writing device according to claim 9, wherein the sensor component is one of an accelerometer, gyro or a combination thereof.

11. The writing device according to claim 8, wherein the collecting unit comprises an optical unit configured to recording said written pattern when created by the user when using said writing device.

12. The writing device according to claim 11, wherein said optical unit is any of a camera, optical sensor or a photodiode.

13. The writing device according to 11, wherein the writing device is included in a body configured as a stylus or pen.

14. A wearable Body Area Network, BAN enabled communication device, worn by a user, for collecting writing pattern by using BAN, wherein said writing pattern is created by said user of a BAN enabled writing communication device and said wearable communication device comprises:
  a processing circuitry configured to:
    i. receive and store at least one of a user ID or user credentials from a wireless communication device;
    ii. establish a BAN link through the body of said user between said wearable BAN enabled communication device and said BAN enabled writing device, when said user touches said BAN enabled writing device;
    iii. receive and store a streamed writing pattern from said BAN enabled writing device, responsive to the user touching the BAN enabled writing device and at least one of a user ID or user credentials being stored in the wearable BAN enabled communication device.

15. The communication device according to claim 14, wherein said processing circuitry is configured to:
add meta data, wherein said meta data comprises any of personal information of said user or position information of said user, to said received writing pattern before storing said writing pattern.

16. A system for collecting writing pattern using a Body Area Network, BAN, wherein said system comprises a BAN enabled writing device, a wireless communication device, and at least one wearable BAN enabled communication device, worn by a user, said writing pattern is created by a user of said writing device and wherein said writing device comprises:
a processing circuitry configured to:
i. establish a BAN link through the body of said user between said BAN enabled writing device and said at least one wearable BAN enabled communication device, worn by said user, when said user touches said BAN enabled writing device;
a collecting unit configured to collect said writing pattern; and
a streaming unit configured to stream said collected writing pattern by using said established BAN link,
wherein said wearable BAN enabled communication device comprises:
a processing circuitry configured to:
i. receive and store at least one of a user ID or user credentials from the wireless communication device;
ii. establish said BAN link between said wearable communication device and said BAN enabled writing device;
iii. receive and store said streamed writing pattern, responsive to the user touching the BAN enabled writing device and at least one of a user ID or user credentials being stored in the wearable BAN enabled communication device.

17. The system according to claim 16, wherein the collecting unit of the writing device comprises at least one sensor component configured to tracking said writing pattern when created by the user with said writing device.

18. The system according to claim 17, wherein the sensor component of the writing device is one of an accelerometer, gyro or a combination thereof.

19. The system according to claim 16, wherein the collecting unit of the writing device comprises at least one optical unit configured to recording said written pattern when created by the user when using said writing device.

20. The system according to claim 16, wherein said processing circuitry of said wearable communication device is configured to:
add metadata, wherein said meta data comprising any of personal information of said user or position information of said user, to said received writing pattern before storing said writing pattern.

* * * * *